(12) United States Patent
Shimajiri

(10) Patent No.: US 6,655,563 B2
(45) Date of Patent: Dec. 2, 2003

(54) CUP HOLDING DEVICE FOR VEHICLE

(75) Inventor: Naohiro Shimajiri, Aichi-ken (JP)

(73) Assignee: Nifco Inc., Yokohama (JP)

( * ) Notice: Subject to any disclaimer, the term of this patent is extended or adjusted under 35 U.S.C. 154(b) by 218 days.

(21) Appl. No.: 09/982,859

(22) Filed: Oct. 22, 2001

(65) Prior Publication Data

US 2002/0050501 A1 May 2, 2002

(30) Foreign Application Priority Data

Nov. 2, 2000 (JP) ........................................ 2000-336589

(51) Int. Cl.[7] .................................................. A47K 1/08
(52) U.S. Cl. ...................... 224/282; 224/926; 248/311.2
(58) Field of Search ................................ 224/275, 282, 224/483, 549, 553, 926; 248/311.2; 296/37.12, 37.13, 37.15, 37.16; 297/188.01, 188.14, 188.16, 188.17, 188.19

(56) References Cited

U.S. PATENT DOCUMENTS

| | | | |
|---|---|---|---|
| 2,649,270 A | | 8/1953 | Franks |
| 5,190,259 A | * | 3/1993 | Okazaki ..................... 224/483 |
| 5,342,009 A | * | 8/1994 | Lehner .................... 248/311.2 |
| 5,628,486 A | * | 5/1997 | Rossman et al. ......... 248/311.2 |
| 5,820,094 A | * | 10/1998 | Tanaka ....................... 224/282 |
| 5,899,426 A | * | 5/1999 | Gross et al. ................. 224/926 |
| 5,997,082 A | * | 12/1999 | Vincent et al. ......... 297/188.19 |
| 6,019,334 A | * | 2/2000 | Shinomiya .................. 224/282 |
| 6,095,471 A | * | 8/2000 | Huang ......................... 224/926 |
| 6,227,509 B1 | * | 5/2001 | Plocher et al. ........... 248/311.2 |
| 6,427,960 B1 | * | 8/2002 | Gehring et al. ............. 224/926 |

FOREIGN PATENT DOCUMENTS

| | | |
|---|---|---|
| DE | 43 44 372 | 6/1995 |
| DE | 197 24 597 | 11/1998 |
| GB | 2 241 872 | 9/1991 |
| JP | 63-93641 A * | 4/1988 ................ 224/926 |
| JP | 6-156139 A * | 6/1994 ................ 224/282 |

* cited by examiner

Primary Examiner—Gary E. Elkins
(74) Attorney, Agent, or Firm—Kanesaka & Takeuchi

(57) ABSTRACT

A cup holding device for a vehicle includes a base member having an opening; a lid member supported at a lower end side of the base member and rotatably shifted between a closed position where the lid member covers the base member and an open position in a using state where the lid member is tilted relative to the base member; and a holding member for holding a periphery of a cup and assembled between the base member and the lid member to be shifted between a vertical housed state at the closed position of the lid member and a horizontal using state at the open position of the lid member. The base member and the lid member have receiving portions for jointly receiving a bottom of a cup to be disposed at the same level at the open position of the lid member.

9 Claims, 9 Drawing Sheets

Fig. 6(a)
Fig. 6(b)
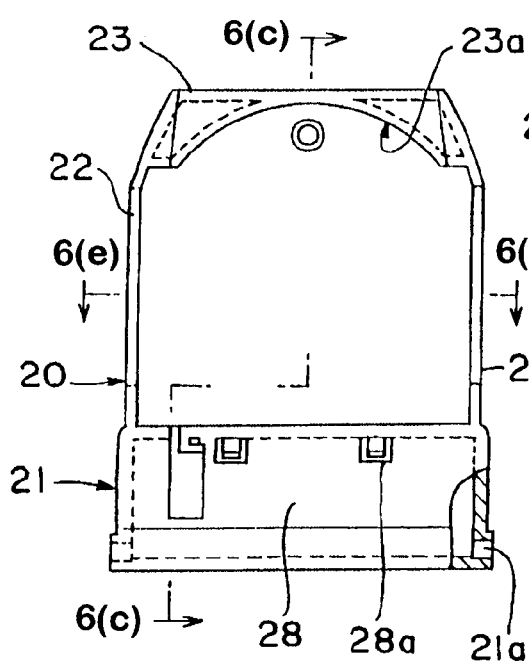
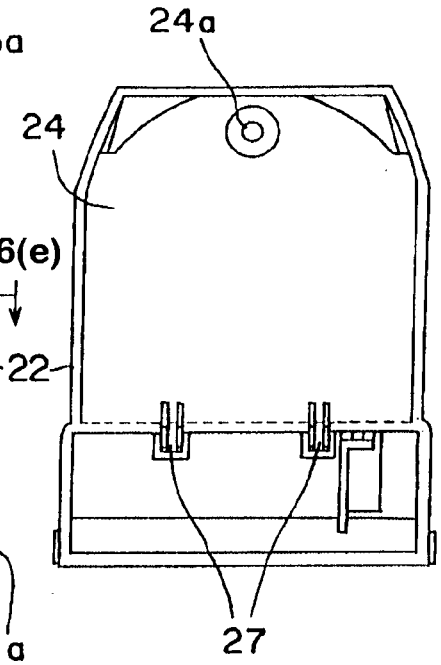
Fig. 6(c)
Fig. 6(d)
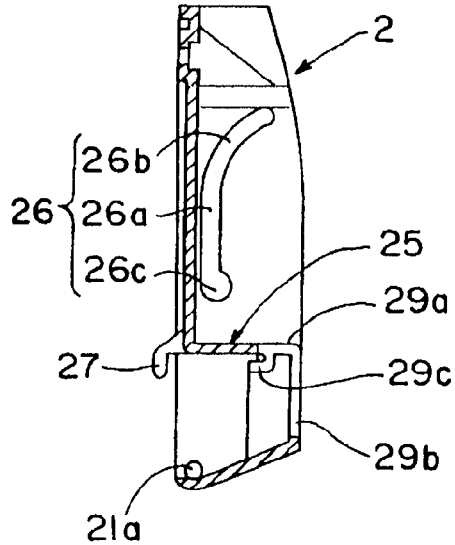
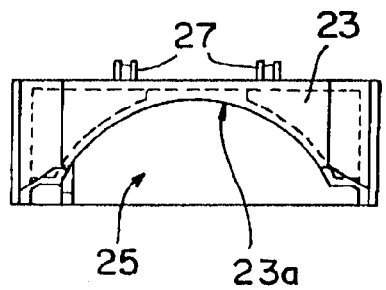
Fig. 6(e)
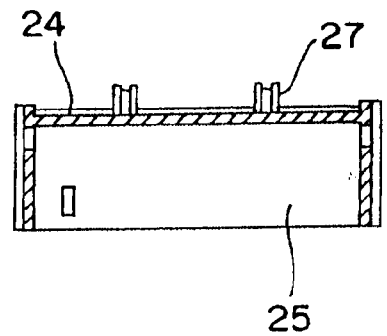

CUP HOLDING DEVICE FOR VEHICLE

BACKGROUND OF THE INVENTION AND RELATED ART STATEMENT

The present invention relates to a cup holding device for a vehicle for holding a drink container, such as can, cup, paper pack and small bottle (hereinafter referred to generally as "cup"), to be installed in a compartment of an automobile, train, vessel, airplane and the like.

Among cup holding devices, there have been proposed many cup holding devices wherein the cup holding devices are attached vertically with respect to portions to be attached. Relating to the present invention, there has been proposed a cup holding device as shown in FIG. 9, i.e. Japanese Patent No. 2610788. A cup holding device 50 as shown in FIG. 9 includes a vertically disposed base member 51; a lid member 52 supported at a lower end side of the base member 51 and shifted from a closed position closely contacting the base member 51 to an open position tilted between the base member 51 and itself; and a holding plate 53 assembled between the base member 51 and the lid member 52 and having a holding hole 53a into which a cup k is inserted. One end of the holding plate 53 is rotatably supported by the lid member 52 and the other end thereof is assembled with respect to the base member 51 to vertically move through fitting of guiding grooves 54 and pins 55.

In case the device is used, as shown in the drawing, when the lid member 52 is rotated to the open position, the holding plate 53 is transferred upward along the guiding grooves 54 to be disposed substantially horizontally. When the cup k is inserted into the holding hole 53a, the periphery of the cup k is held by an inner periphery of the holding hole 53a, and a bottom portion thereof is held by projections 56 provided at an inner side of the lid member 52. In the cup holding device 50, since the lid member 52 is rotated by an angle smaller than 90° with respect to the base member 51 to take the open position, the projecting amount of the lid member in the compartment is reduced to thereby be superior in safety, and the space in the compartment can not be sacrificed in the using state.

In the above-described structure, since the bottom of the cup k is held only by the projections 56 provided at the inner side of the lid member 52, the stable holding of the cup k may be hampered due to vibrations of the vehicle. As measures for improving the structure, for example, when the projections 56 are widened in their surfaces, the thickness of the entire device is also increased, so that the device can not be made compact. Also, since the holding hole 53a is formed only in the holding plate 53, a length from the base member 51 to the forward end of the holding plate 53 in the using state becomes long, so that the open angle of the lid member 52 has to be set large in proportion to the length. Thus, in the conventional device, the space in the compartment has not been effectively used because the length of the lid member projecting into the compartment can not be further decreased, or a position in the compartment, to which the device is installed, is limited.

The present invention has been made to obviate the above defects, and an object of the invention is to provide a cup holding device for a vehicle, wherein even in case the open angle of the lid member in the using state is made smaller, the cup can be firmly stably held, so that the using condition of the cup holding device can be improved and there is no limitation in the installation position. Thus, the space in the compartment can be effectively used and the safety can be improved.

Further objects and advantages of the invention will be apparent from the following description of the invention.

SUMMARY OF THE INVENTION

In order to attain the above objects, in the present invention, a cup holding device for a vehicle includes a base member with an opening in a front portion thereof and vertically disposed with respect to a portion to be attached; a lid member supported at a lower end side of the base member to be rotatably shifted from a closed position where the lid member covers the base member to an open position in a using state where an angle between the lid member and the base member becomes large; and a holding member for holding a periphery of a cup and assembled between the base member and the lid member to be shifted from a vertically positioned housed state at the closed position of the lid member to a horizontally-positioned using state at the open position of the lid member. The base member and the lid member have receiving portions, respectively, disposed in the same level at the open position of the lid member to jointly receive thereon a bottom portion of the cup.

According to the above-described structure, at the open position of the lid member, since the receiving portion of the base member and the receiving portion of the lid member are disposed at substantially the same level, even in the structure wherein the open angle of the lid member is made smaller than 90°, the bottom of the cup can be jointly supported by the receiving portions to thereby hold the cup more safely. In this case, according to one aspect of the invention, the base member includes a notched portion at a part on the upper side thereof, and the receiving portion of the base member is formed on a lower inner side positioned right under the notched portion, so that the cup can enter the inside of the base member due to presence of the notched portion to thereby make the open angle of the lid member smaller to the extent such that the cup enters the inside of the base member in the using state.

Also, according to another aspect of the invention, in the cup holding device for the vehicle including the above-described prerequisite elements, the holding member constitutes a second holding portion in a substantially semi-circular arc shape, and the base member constitutes a first holding portion for holding the periphery of the cup together with the second holding portion.

According to the structure, at the open position of the lid member, the second holding portion of the holding member and the first holding portion of the base member are disposed in an opposed state. Thus, even in the structure wherein the open angle of the lid member becomes smaller than 90°, the periphery of the cup can be held together by both holding portions to thereby stably hold the cup. Thus, as described before, the open angle of the lid member in the using state can be made smaller in the degree such that the cup holding position enters the inside of the base member because of presence of the first holding portion.

In this case, according to a further aspect of the invention, the holding member includes a frame portion in a semi-circular arc shape for forming the second holding portion, and an arm portion projecting forward from an intermediate position of the frame portion at the open position of the lid member. Both ends of the frame member are fitted into guiding grooves vertically provided on both inner sides of the base member, and the arm portion is rotatably supported to the lid portion. Thus, the cup can be easily inserted into the frame portion, the weight of the device can be lightened, the holding member 4 can be stably operated, and the appearance characteristics of the device can be improved.

In the above-stated aspects of the invention, it is preferable to house the base member inside the lid member in view of the opening-closing operating ability and the appearance characteristics of the lid member. Also, according to a still further aspect of the invention, in view of the efficiency, in case there is provided an urging member disposed between the base member and the lid member to urge the lid member to the closed position or the open position by shifting the operation direction according to a rotation angle of the lid member, parts for constituting the cup holding device can be reduced to a minimum and the operation characteristics of the lid member can be improved.

BRIEF DESCRIPTION OF THE DRAWINGS

FIGS. 6(a) to 6(e) are drawings showing particular portions of a base member of the device as shown in FIG. 1;

DETAILED DESCRIPTION OF PREFERRED EMBODIMENTS

Figure 1:
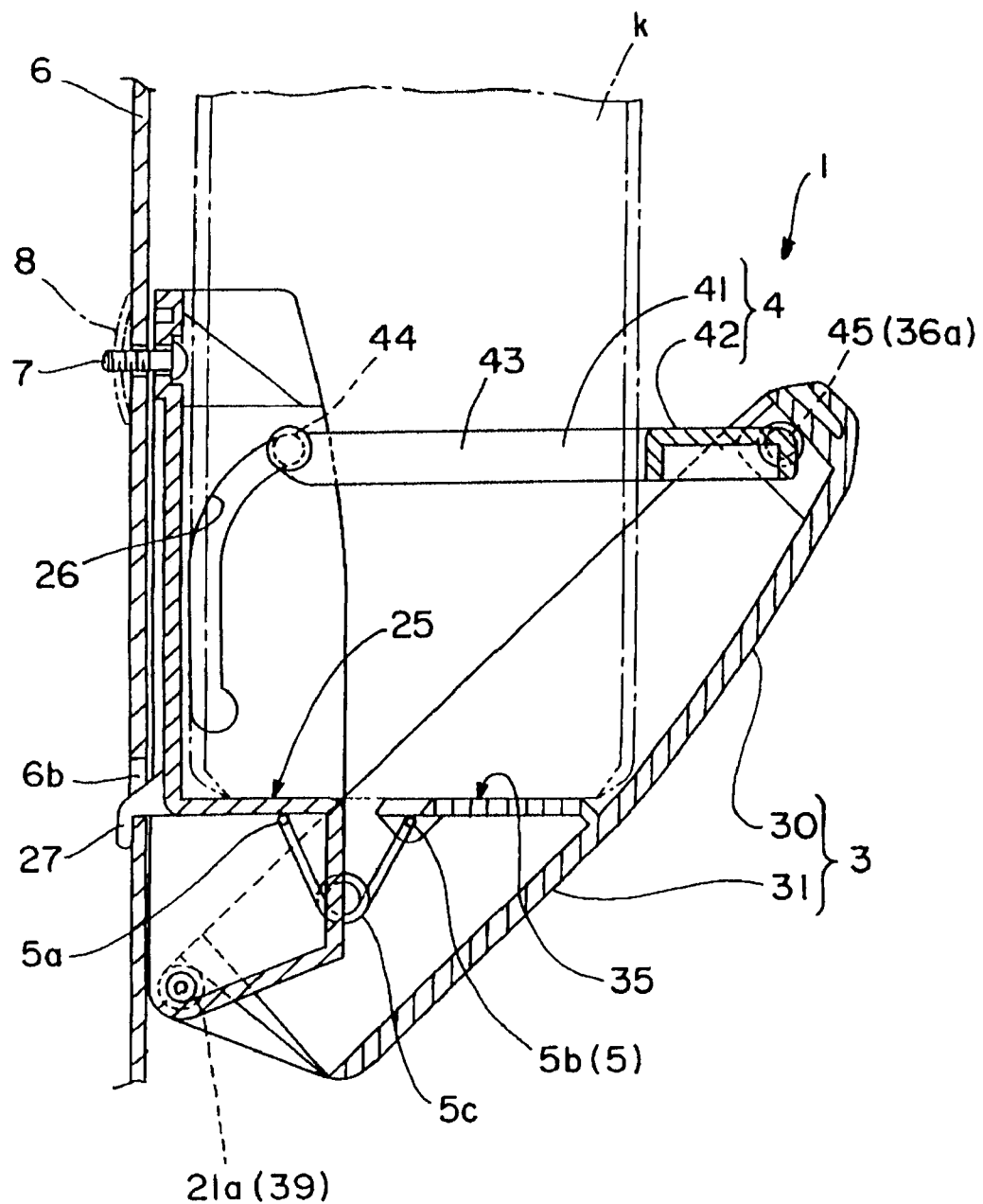
FIG. 1 is a vertical sectional view of an entire device to which the present invention is applied, wherein a lid is in an open position.
Figure 2:
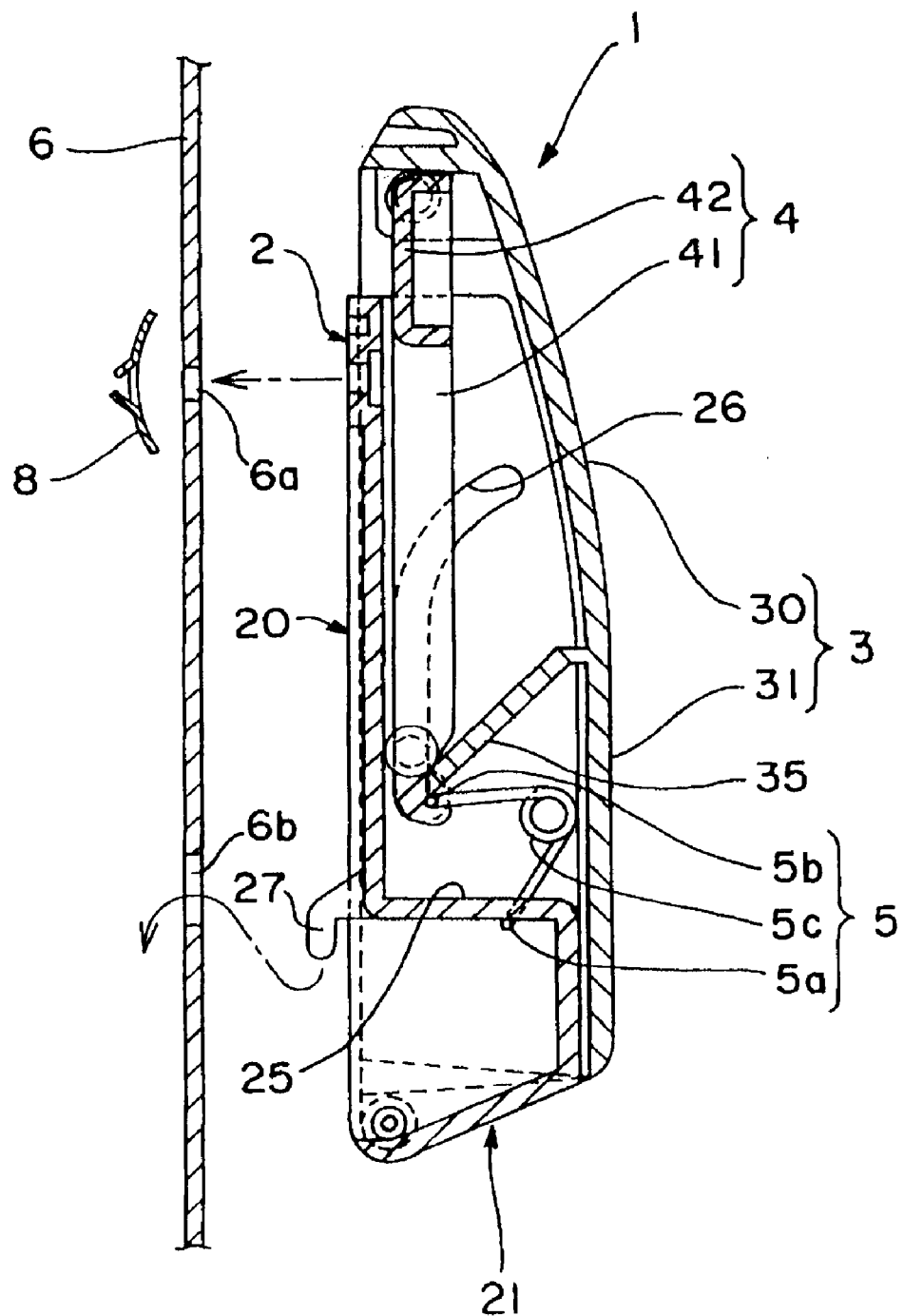
FIG. 2 is a vertical sectional view of the device shown in FIG. 1, wherein the lid is in a closed position.
Figure 3:
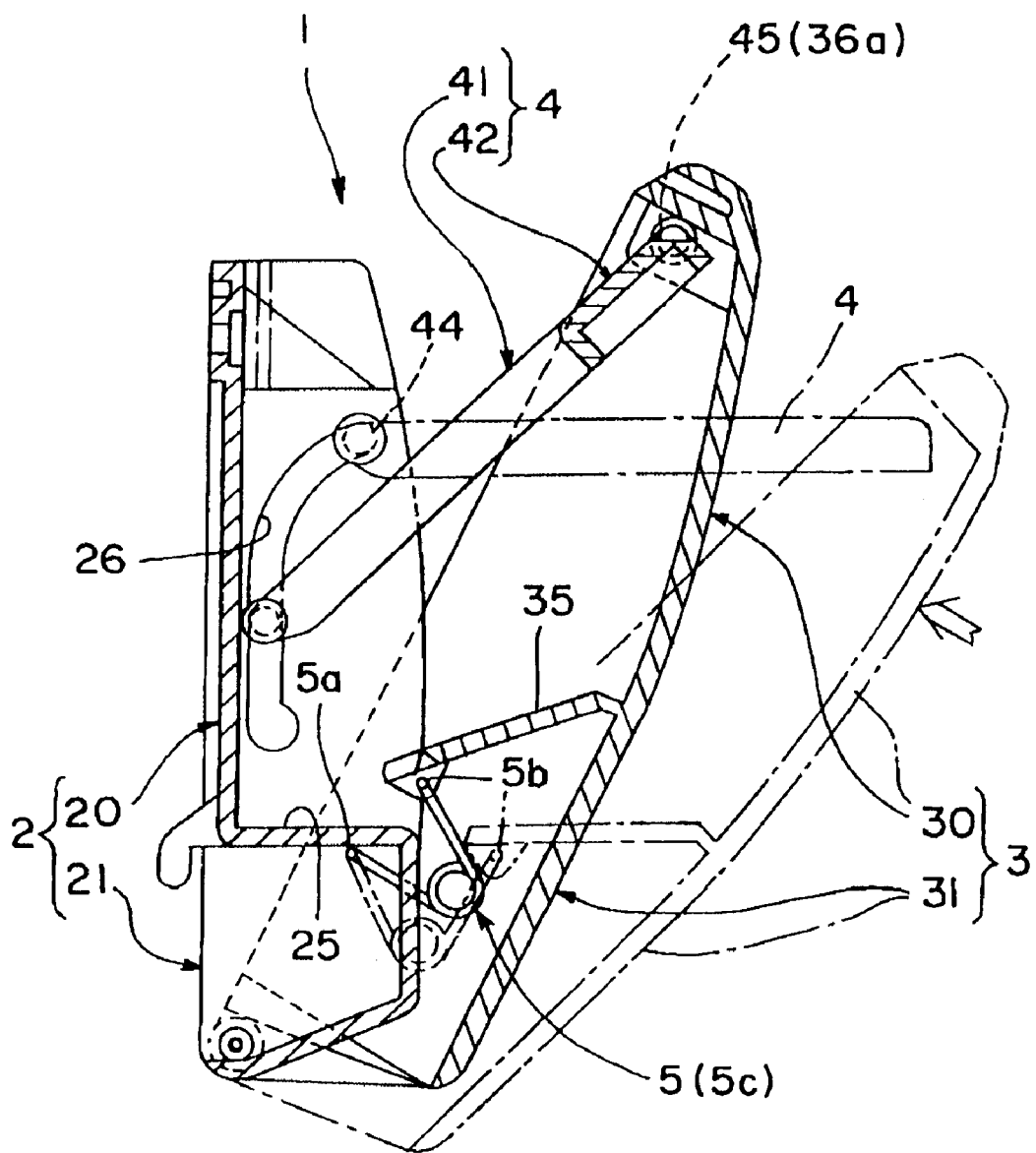
FIG. 3 is a vertical sectional view of the device shown in FIG. 1, wherein the lid is on the way to the closed position from the position shown in FIG. 1.
Figure 4:
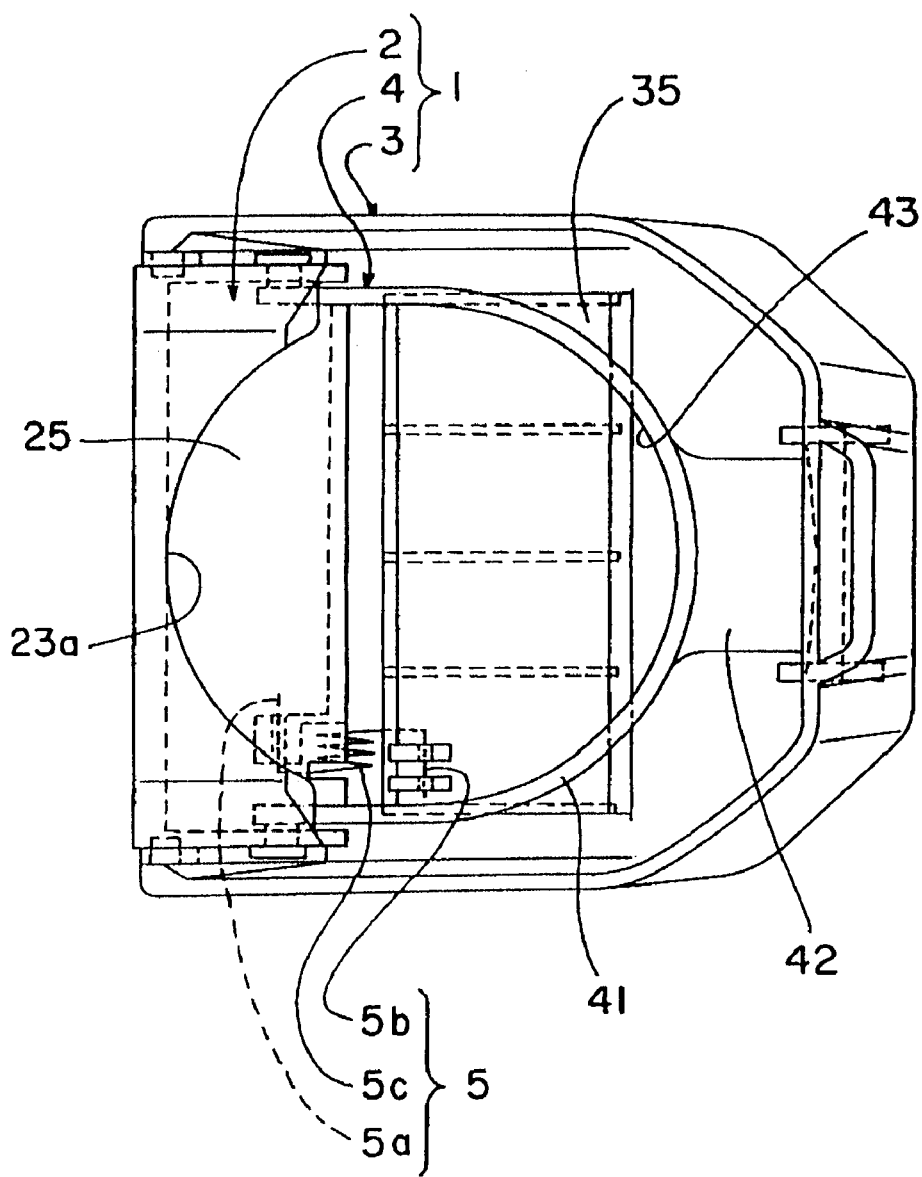
FIG. 4 is a plan view viewed from the upper part of the device as shown in FIG. 1.
Figure 5:
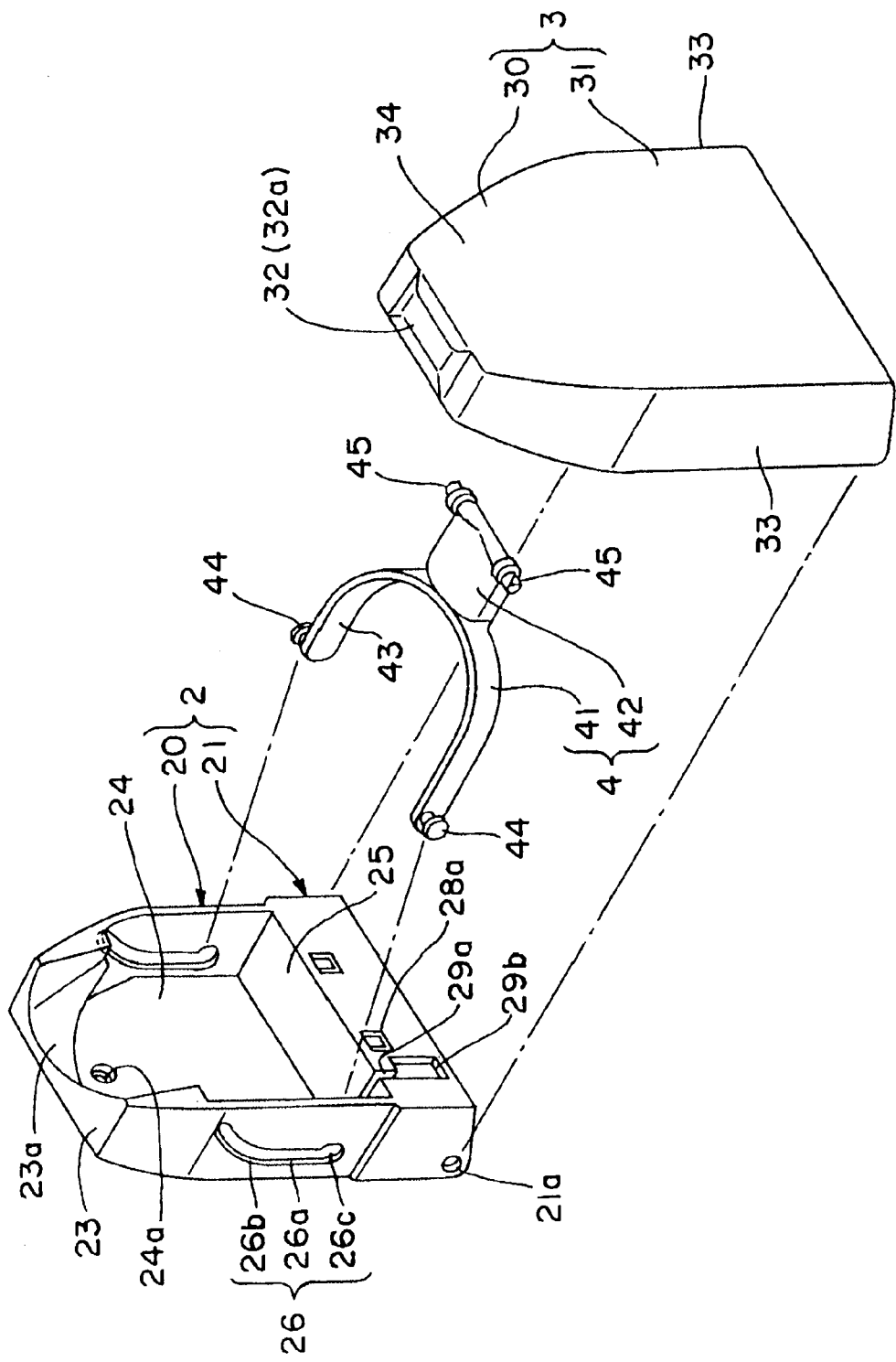
FIG. 5 is an exploded perspective view for showing a relationship among the constituting members of the device.
Figure 7A:
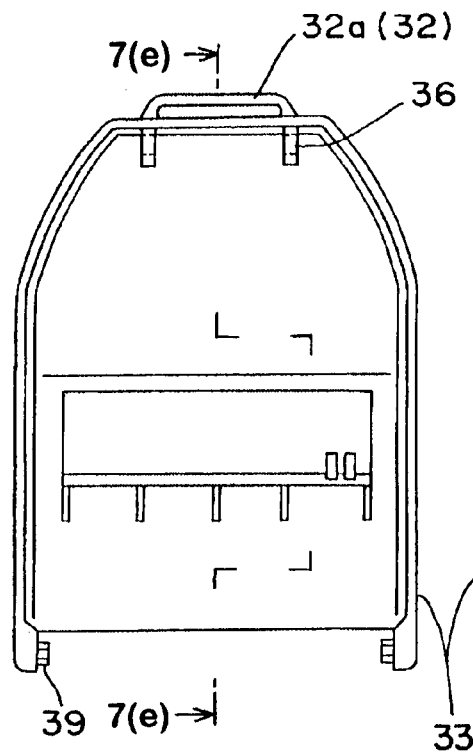
FIGS. 7(a) to 7(e) are drawings showing particular portions of the lid member of the device as shown in FIG. 1.
Figure 7B:
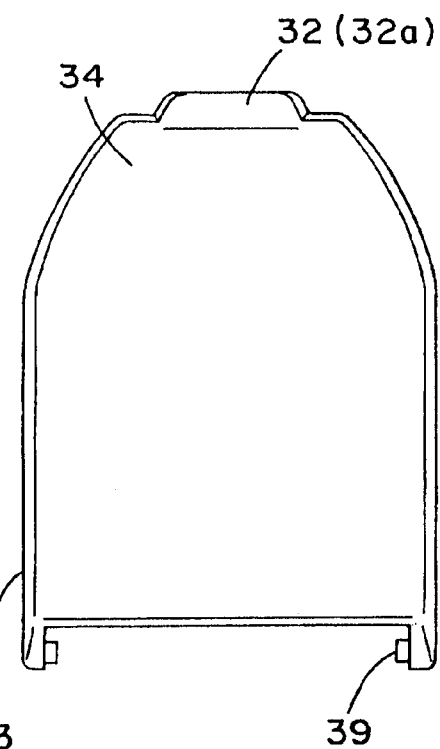
Figure 7C:
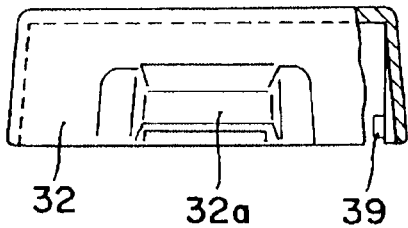
Figure 7D:
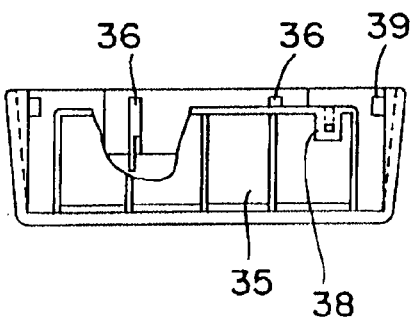
Figure 7E:
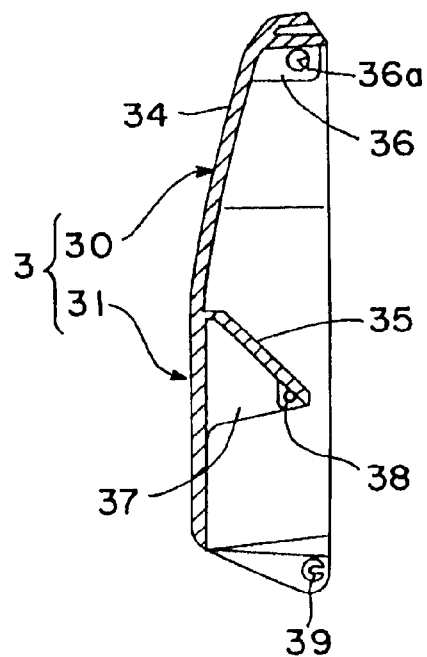
Figure 8A:
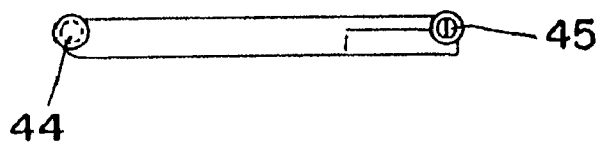
FIGS. 8(a) to 8(d) are drawings showing particular portions of a holding member of the device as shown in FIG. 1.
Figure 8B:
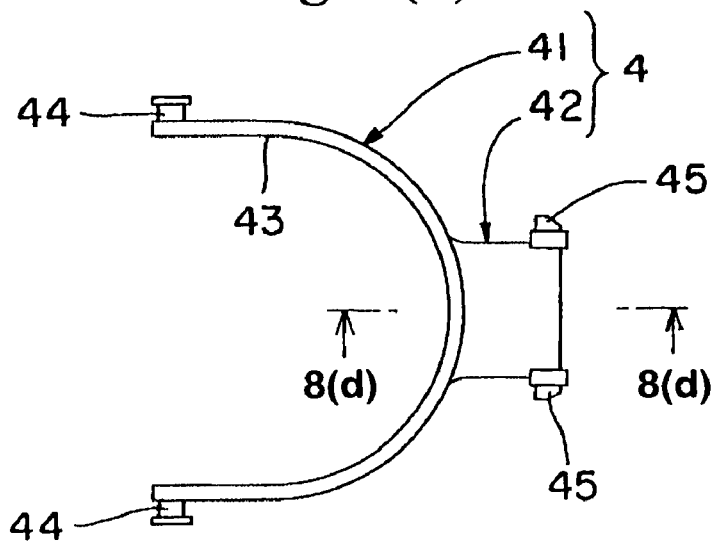
Figure 8C:
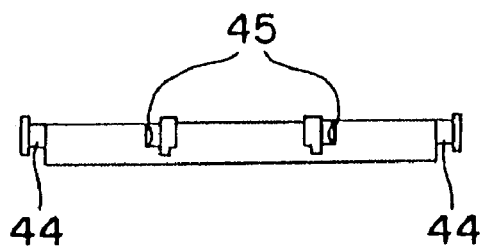
Figure 8D:
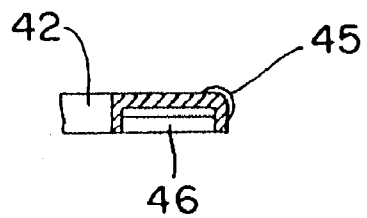
Figure 9:
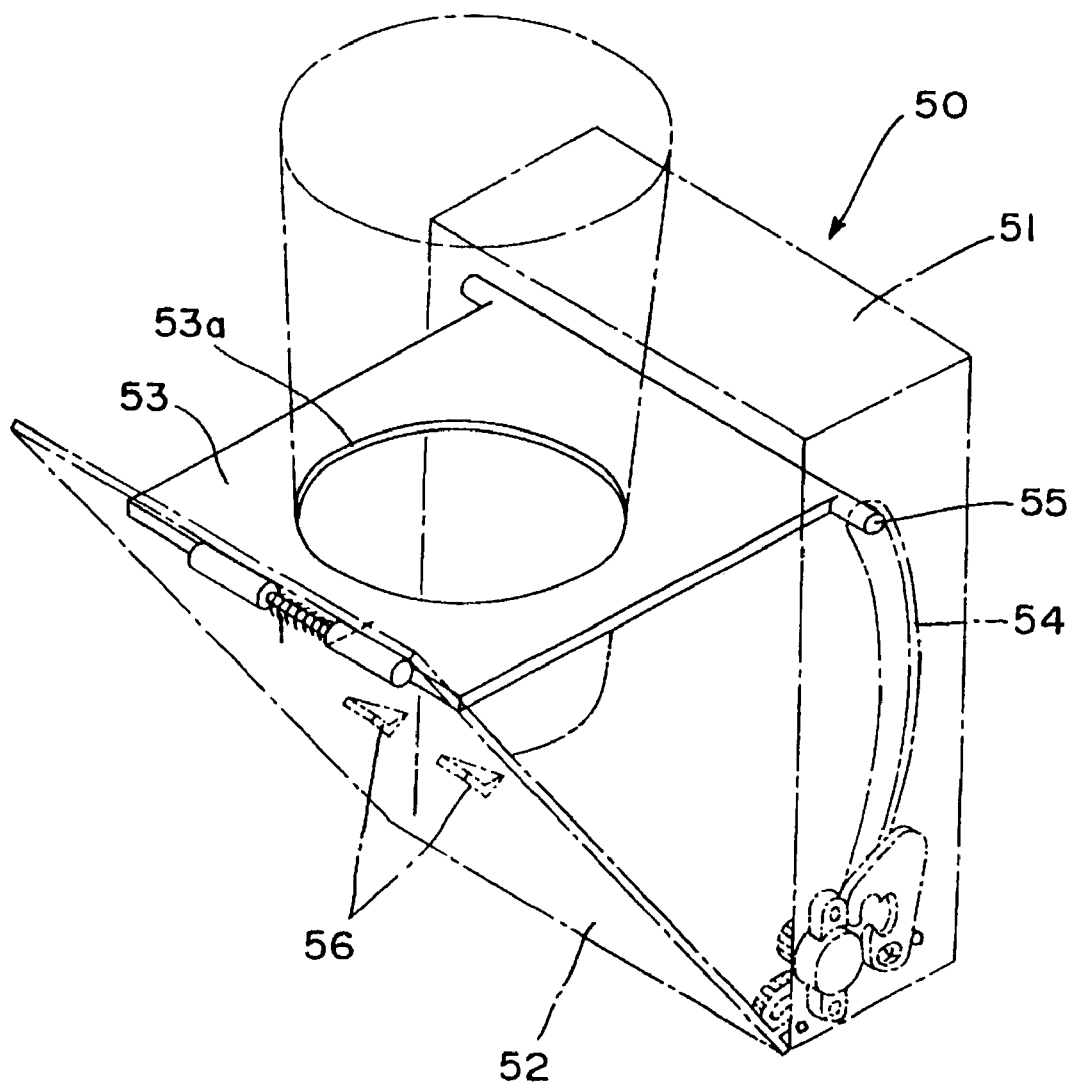
FIG. 9 is a perspective view showing a conventional cup holding device.

Hereunder, embodiments of the present invention will be explained with reference to the accompanying drawings. FIGS. 1 through 8 show an embodiment of a cup holding device for a vehicle to which the present invention is applied. Among the drawings, FIG. 1 is a vertical sectional view of an entire device wherein a lid is in an open state, i.e. the device is in a using state; and FIG. 2 is a vertical sectional view of the entire device wherein the lid is in a closed state, i.e. the device is in a non-using state. FIG. 3 is a vertical sectional view showing a state wherein the lid is rotated to the middle of the way when the operating direction of an urging device is changed; and FIG. 4 is a plan view of the state of FIG. 1 viewed from the upper side thereof. FIG. 5 is an exploded perspective view showing a relationship among main constituting members. FIG. 6(a) is a partially broken front view of a base member; FIG. 6(b) is a rear view of the same; FIG. 6(c) is a sectional view taken along line 6(c)—6(c) in FIG. 6(a); FIG. 6(d) is a plan view of the same; and FIG. 6(e) is a sectional view taken along line 6(e)—6(e) in FIG. 6(a). FIG. 7(a) is a front view which is an inner side of the lid; FIG. 7(b) is a rear view which is an outer side of the lid; FIG. 7(c) is a partially broken plan view of the lid; FIG. 7(d) is a bottom view; and FIG. 7(e) is a sectional view taken along line 7(e)—7(e) in FIG. 7(a). FIG. 8(a) is a front view of a holding member; FIG. 8(b) is a plan view of the same; FIG. 8(c) is a right side view of FIG. 8(b); and FIG. 8(d) is a sectional view taken along line 8(d)—8(d) in FIG. 8(b).

A cup holding device 1 according to the embodiment is of a vertical type to be attached vertically with respect to a portion to be attached 6 (hereinafter referred to simply as "portion 6") on a side of a compartment of a vehicle. The cup holding device 1 includes a base member 2 to be installed to the portion 6; a lid member 3 to be switched from a closed position to an open position and vice versa with respect to the base member 2; a holding member 4 held at one end thereof by the base member 2 so that the holding member 4 is switched from a housed state held in the base member 2 to a using state horizontally disposed and vice versa; and an inversion spring 5 as an urging member for urging the lid member 3 toward the open position or the closed position. Incidentally, the portion 6 may be, for example, a door trim, seat back side, interior equipment or the like for constituting a compartment. In short, any portion which is a vertical wall may be the portion 6.

In the present embodiment, as shown in FIG. 1, a trim board is used, and an attaching hole 6a and engaging holes 6b corresponding to the structure of the device 1 are provided. Also, while the base member 2, the lid member 3 and the holding member 4 of the embodiment are formed of resin moldings, the material may be other than these moldings. In the following explanations of the respective members, detailed explanations including assembling methods will be given.

As shown in FIGS. 5 and 6(a) to 6(e), the base member 2 includes a main portion 20 with an opening in the front side thereof to have a container shape, and a small box portion 21 provided on the lower side of the main portion 20. The main portion 20 is partitioned by both side wall portions 22, an upper portion 23, a lower inner side 25 and a back surface portion 24. The both side wall portions 22 are provided with guiding grooves 26 in a vertical direction, respectively. The guiding groove 26 has a shape corresponding to a moving locus of the holding member 4 wherein a portion from the lower end to a slightly upper side relative to the middle of the groove 26 constitutes a straight line groove 26a and an upper portion above that portion constitutes a curved groove 26b slightly curved toward the front opening side. As shown in FIG. 6(c), each groove lower end is formed to be a slightly larger circular portion 26c so that a shaft portion 44 of the holding member 4, described later, fits from this portion to be assembled into the guiding groove 26, i.e. toward the straight line groove 26a.

An upper portion 23 is provided with a notched portion 23a notched in a semi-circular shape from the front side to the rear side. The notched portion 23a has a circular arc corresponding to a periphery of a cup k, and constitutes a first holding portion. The lower inner side portion 25 is exposed through the notched portion 23a when the base member 2 is viewed from an upper side, and constitutes a reception portion for receiving thereon a bottom of the cup k. A back side portion 24 is provided with an attaching through-hole 24a at the upper middle portion thereof. The back side portion 24 is also provided with a pair of hook portions 27 to project outward. The attaching hole 24a and the respective hook portions 27 correspond to the above described attaching hole 6a and engaging holes 6b. As shown in FIGS. 1 and 2, when the respective hooks 27 are inserted into the corresponding engaging holes 6b to be engaged with each other, the attaching hole 24a is placed on the attaching hole 6a. Then, a screw 7 is commonly inserted into the respective attaching holes 24a and 6a, and a portion projecting toward the back side of the portion 6 is engaged with a spring nut 8 to thereby easily attach the base member 2 to the portion 6. Normally, the installation work like this can be carried out in a state where the cup holding device 1 is assembled. The attaching structure can be properly changed.

The small box portion 21 has an opening on the side opposite to the side of the opening of the main portion 20, i.e. on the back side thereof, to have a small container shape. The small box portion 21 is formed of both side walls, an upper portion, a lower portion and a front side portion 28. Among these, the both side walls are provided with shaft through-holes 21a at lower rear sides, respectively. The upper portion is a wall for constituting the above-stated lower inner side portion 25. The upper portion, i.e. lower inner side portion 25, and the front side portion 28 are provided with a common slit 29a. The slit 29a is a through-groove for setting one end 5a of the inversion spring 5, described later, free. The front side wall 28 is provided with a passing-through portion 29b provided by widening the groove width with respect to the slit 29a. The passing-through portion 29b is a square through-hole for allowing a coil portion 5b of the inversion spring 5 to pass into or out of the small box portion 21. Also, reference numeral 29c shown in FIG. 6(c) is an engaging portion engaging the one end 5a of the inversion spring 5 provided to correspond to the slit 29a. Reference numeral 28a represents a die cutting hole of the hook portion 27.

As shown in FIGS. 2, 5 and 7(a) to 7(e), a lid member 3 is formed of a rounded upper side 30 and a rectangular lower side 31 to have a container shape larger than the base member 2, and covers the base member 2 to house therein. The lid member 3 includes an upper portion 32, both side portions 33 and a front side portion 34. The upper portion 32 is provided with a holding portion 32a slightly protruding upward. A pair of ribs 36 is provided at an intermediate position on an inner side of the upper portion 32 to project downward. The both ribs 36 are disposed with a space therebetween to correspond to a plate width of an arm portion 42 of the holding member 4, described later, and have shaft holes 36a coaxially provided in the horizontal direction, respectively.

A receiving portion 35 extending in its widthwise direction is provided at a position slightly lower than the intermediate portion on the back side, i.e. inner side, of a front side portion 34. The receiving portion 35 is a wall to be spaced slightly from the respective side portions 33, and has a predetermined downward inclination. As shown in FIG. 1, at an open position of the lid member 3, the receiving portion 35 becomes the same level as that of the lower inner side portion 25 which is the receiving portion as described before. As shown in FIG. 2, at a closed position of the lid member 3, the receiving portion 35 is located at a position higher than the lower inner side portion 25. Incidentally, as shown in FIGS. 7(d) and 7(e), the receiving portion 35 includes a plurality of enforcing ribs 37 to obtain rigidity, and an engaging portion 38 for engaging the other end 5b of the inversion spring 5 disposed on a side facing the front side portion 34. The reference numeral 39 represents shaft portions corresponding to the above-described shaft holes 21a projecting from inner sides of both side portions 33.

The lid member 3 as described above is engaged with the base portion 2 through engagement of the shaft portions 39 on both sides and the shaft holes 21a corresponding thereto. The lid member 3 is shifted rotatably around the shaft portions 39, to the closed position wherein the lid member 3 is laid over the base member 2, i.e. in a covered or closed state as shown in FIG. 2; or to the open position wherein an angle between the base member 2 and the lid member 3 is increased as shown in FIG. 1. In the present embodiment, the open position of the lid member 3, i.e. the maximum inclined angle, is designed to be about 40°.

As shown in FIGS. 4, 5 and 8(a) to 8(d), the holding member 4 includes a frame portion 41 in a semi-circular arc shape, and an arm portion 42 projecting from an intermediate portion of the frame portion 41. The frame portion 41 has a curvature formed by considering an average outer diameter of cups k, and an inner side 43 thereof constitutes a second holding portion for binding or holding the periphery of the cup k together with the notched portion 23a as the above-stated first holding portion. Also, the frame portion 41 includes shaft portions 44 projecting outward from both ends thereof. Incidentally, the size between both ends of the frame portion 41 corresponds to the size between both side portions 22 constituting the base member 2.

The arm portion 42 has a function for determining a relative position of the frame 41 and a function for attaching the frame portion 41 to the lid member 3. More specifically, the arm portion 42 has a shape of a narrow-width plate, and has a length such that the frame portion 41 is located right above the receiving portion 35 in the using state as shown in FIG. 1. Shaft portions 45 to be engaged with the corresponding shaft holes 36a are provided to the forward ends on both sides of the arm portion 42. A depressed portion 46 is formed on the lower side of the arm portion 42 to thereby lighten the device as well as easily carry out the engaging operation between the shaft portions 45 and the shaft holes 36a.

The above described holding member 4 is assembled between the base member 2 and the lid member 3. In this case, for example, from the state wherein the lid member 3 is rotatably pivoted to the base member 2 as described above, first, the holding member 4 is fitted into the guiding grooves 26 of the base member 2. In other words, the shaft portions 44 on both sides are fitted into the circular portions 26c of the guiding grooves 26 and then moved toward the straight line grooves 26a and the curved grooves 26b as shown in FIG. 2. Next, the holding member 4 is engaged with the shaft holes 36a of the lid member 3. In this case, as shown in FIG. 1, the lid member 3 is rotated to the open position, and then both shaft portions 45 are engaged with the corresponding shaft holes 36a. When the inversion spring 5 is assembled to the cup holding device 1 assembled as described above, the assembly of the cup holding device 1 is completed. The inversion spring 5 has a coil portion 5c between both ends 5a, 5b. In assembling the inversion spring 5, for example, from the state as shown in FIG. 1, the other end 5b is engaged with the engaging portion 38 of the lid member 3. Then, a part of the coil portion 5c enters the passing-through portion 29b. The one end 5a is disposed inside the small box portion 21 through the slit 29b to be engaged with the engaging portion 29c in the small box portion 21 while receiving a slight urging pressure.

Next, the opening and closing operations of the cup holding device 1 will be described. In FIGS. 1 and 4, the lid member 3 is in the open position with the maximum rotation angle. In this state, both shaft portions 44 are stopped at the ends of the curved grooves 26, and at the same time, the lid member 3 is held at a designed inclination angle by absorbing wobbling between the base member 2 and itself through the urging force of the inversion spring 5. The holding member 4 is held with a substantially right angle with respect to the base member 2 and parallel to the receiving portions 25 and 35 through the pivoting engagement between the shaft portions 45 and the shaft holes 36a. Therefore, with the structure, it is possible to satisfy the basic concept in the compartment of the vehicle that the projecting portion to which a passenger may inadvertently hit is reduced as little as possible. For example, in a state where the cup k is not held, even if the passenger strongly hits the lid member 3, the lid member 3 is positively shifted to the closed position along the guiding grooves 26 from its inclined state.

Also, when the cup k is inserted between the notched portion 23a as the first holding portion and the inner side 43 of the frame portion 41 as the second holding portion, a bottom portion of the cup k is received jointly by the lower inner side 25 as the receiving portion of the base member 2 and the receiving portion 35 of the lid member 3. In other words, with the structure, the periphery of the cup k is held jointly by the holding portions 23a, 43, and also, the bottom of the cup k is supported jointly by the receiving portions 25, 35. Thus, in the structure, even in a cup holding device of a type wherein an open angle of the lid member 3 is sufficiently smaller than 90°, the cup k can be stably held to thereby improve its using condition and credibility. It is also possible to structure the cup holding device with the minimum number, i.e. four in the present embodiment, of parts to thereby reduce a manufacturing cost.

Next, in case the cup holding device is not used, after the cup k is removed, as shown in FIG. 3, the lid member 3 is rotated toward the closed position against the urging force of the inversion spring 5. In the course of rotation, the holding member 4 is moved downward through the rear end sides, i.e. the shaft portions 44, to be fitted into and transferred along the guiding grooves 26, and is pulled into the base member 2. At this time, when the lid member 3 is rotated to substantially an intermediate point as shown in FIG. 3, the inversion spring 5 shifts its urging direction to the closed position of the lid member 3. After that, the lid member 3 is automatically rotated to the closed position by the urging force of the inversion spring 5. When the lid member 3 is shifted from the closed position to the open position, after the lid member 3 is rotated from the closed position to the intermediate point to the open position, the inversion spring 5 also shifts its urging direction so that the lid member 3 is automatically rotated to the open position, i.e. the maximum open angle (about 40°) as shown in FIG. 1, by the spring urging force.

Incidentally, except for the constituting elements according to the first and third aspects of the present invention, the present invention can be modified in many ways by changing the constituting elements as bases. As an example, instead of the cylindrical cup k as in the present embodiment, for a cup of a square columnar shape, the shapes of the respective members may be designed correspondingly to the square columnar cup; or the shaft portions 39 and the shaft holes 21a or the shaft portions 45 and the shaft holes 36a may be replaced reversely to correspond respectively.

As described above, in the cup holding device of the invention, when the cup holding device is used, the lid member is opened with an angle smaller than 90°. According to one aspect of the invention, the receiving portion of the base member and the receiving portion of the lid member are positioned substantially on the same level when used, so that the bottom portion of the cup is received jointly by both receiving portions. According to another aspect of the invention, the second holding portion of the holding member and the first holding portion of the base member are disposed to face each other, so that the periphery of the cup is held jointly by both holding portions. Thus, the cup can be held by the cup holding device of the invention in a more stable manner relative to the conventional device to thereby improve the using condition of the cup.

In the above-described invention, the receiving portion of the base member in one case and the first holding portion of the base member in the other case are located in the inner portion of the base member as much as possible to thereby reduce the open angle of the lid member to a smaller degree when used, so that installation of the device is not restricted to thereby utilize the space in the compartment effectively, and improve its safety.

While the invention has been explained with reference to the specific embodiments of the invention, the explanation is illustrative and the invention is limited only by the appended claims.

What is claimed is:

1. A cup holding device for a vehicle, comprising:
   a base member having front and lower portions, an opening formed at the front portion, and a first receiving portion formed at a front lower portion,
   a lid member pivotally supported at the lower portion of the base member and having a second receiving portion, said lid member rotatably shifted between a closed position where the lid member covers the base member and an open position in a using state where the lid member is tilted with respect to the base member, and
   a holding member for holding a periphery of a container, said holding member being assembled between the base member and the lid member to be shifted between a vertical state at the closed position of the lid member and a horizontal using state at the open position of the lid member so that said first and second receiving portions of the base member and the lid member are positioned substantially at a same level at the open position of the lid member to jointly receive thereon a bottom portion of the container.

2. A cup holding device according to claim 1, wherein said base member includes a notched portion at an upper portion thereof for partly receiving the cup therein, said first receiving portion being located under the notched portion.

3. A cup holding device according to claim 2, wherein said base member is substantially vertically disposed with respect to a portion to be attached.

4. A cup holding device according to claim 2, wherein said second receiving portion is located above the first receiving portion when the lid member is in the closed position.

5. A cup holding device according to claim 2, wherein said holding member includes a frame portion having two ends slidably connected to the base member and a semicircular inner portion between the two ends for holding the container together with the notched portion; and an arm portion fixed to the frame portion and rotatably attached to the lid member.

6. A cup holding device according to claim 1, further comprising an urging member disposed between the base member and the lid member to urge the lid member from the closed position to the open position and vice versa by shifting an operation direction according to a rotation angle of the lid member.

7. A cup holding device for a vehicle, comprising:
   a base member having front, upper and lower portions, an opening formed at the front portion, and a first holding portion formed at a front upper portion,
   a lid member pivotally supported at the lower portion of the base member to be rotatably shifted between a closed position where the lid member covers the base member and an open position in a using state where the lid member is tilted with respect to the base member, and a holding member for holding a periphery of a container assembled between the base member and the lid member to be shifted between a vertical state at the closed position of the lid member and a horizontal using state at the open position of the lid member, said holding member having a second holding portion with a semi-circular arc shape so that a periphery of the container is jointly supported by the first and second holding portions.

8. A cup holding device according to claim 7, wherein said holding member includes a frame portion having the semi-circuit arc shape to constitute said second holding portion and an arm portion projecting forward from an intermediate position of the frame at the open position of the lid member; said base member includes vertical guiding grooves on two sides thereof, two ends of said frame being fitted in the vertical guiding grooves of the base member; and said arm portion is rotatably supported at one side of the lid member.

9. A cup holding device according to claim 7, further comprising an urging member disposed between the base member and the lid member to urge the lid member from the closed position to the open position and vice versa by shifting an operation direction according to a rotation angle of the lid member.

* * * * *